March 4, 1924.
A. ADAMS
GALVANIC ELEMENT
Filed Aug. 25, 1923
1,486,069
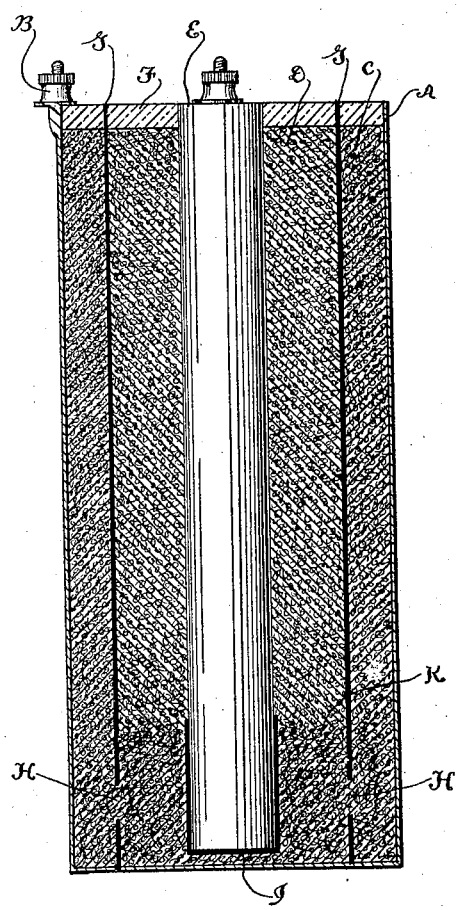
Inventor
Albert Adams,
By L. N. Gilley
Attorney Patented Mar. 4, 1924.

1,486,069

UNITED STATES PATENT OFFICE.

ALBERT ADAMS, OF MACON, GEORGIA, ASSIGNOR TO SCHUSTER-ADAMS CHEMICAL COMPANY, A CORPORATION OF DELAWARE.

GALVANIC ELEMENT.

Application filed August 25, 1923. Serial No. 659,329.

*To all whom it may concern:*

Be it known that I, ALBERT ADAMS, a citizen of the United States, residing at Macon, in the county of Bibb and State of Georgia, have invented certain new and useful Improvements in Galvanic Elements, of which the following is a specification.

This invention relates to a galvanic element and has for its object to provide an element that is efficient in its operation as to the output of current and as to its duration of life.

Another object of the invention is to produce an element that will stand transportation without less of efficiency and that is economical to manufacture.

With these and other objects in view which will be disclosed as the description proceeds, my invention consists in the novel features hereinafter described in detail, illustrated in the accompanying drawings and more particularly pointed out in the appended claims.

Referring to the single figure of the drawing which is a diagrammatic representation of my invention, A represents a zinc container having the usual thumb screw conductor attaching means B. Within this container I place the zinc electrolyte C usually in the form of a solid or semi-solid, the sulphate of potash or the sulphate of soda or magnesia may be economically used.

D represents the carbon electrolyte and may consist of a mixture of about 14.73% bichromate of soda; 48.45% sulphuric acid; 36.82% of water. This electrolyte may be also in solid or semi-solid form.

E represents the carbon and F the air excluding and sealing cover made of any suitable material.

The zinc electrolyte C is partially separated from the carbon electrolyte D by a non-conducting cylinder G shown in section in the figure. This cylinder is provided with openings H near its bottom, the cylinder G being open at the bottom. I further provide an insulating material I covering the carbon E at its bottom and some distance up its sides.

I first place the celluloid cylinder G in the zinc casing A and fill between the two with the potash or soda salt, filling also the bottom of the celluloid cylinder with soda salt, the salt on the exterior of the celluloid cylinder communicating through the holes H with the same salt on the interior of the celluloid cylinder. This salt extends up to near the end of the coating I on the carbon. I then fill the rest of the celluloid cylinder with the carbon electrolyte mixture above specified and then seal the top of the element with the sealing composition D.

Where I desire an element of long duration I may change somewhat the above composition as follows:

For the carbon 18.86% bichromate of soda; 43.39% sulphuric acid; 37.75% water, and for the zinc electrolyte, sulphate of potash in saturated solution or plain water for the zinc electrolyte would be operative.

The zinc and carbon electrolyte meet in a region K just below the top of the insulated part of the carbon E and the holes H in the celluloid cylinder permit an unbroken column of the zinc electrolyte and the meeting surfaces of the two electrolytes are not separated from each other.

In case the elements are to be transported they may be converted into a solid form or jelly-like mass by any suitable binding chemical that does not interfere with the activity of the working chemicals, for instance, silicate of potash or silicate of soda may be used.

What I claim as my invention is:

1. A galvanic element comprising a zinc receptacle, a carbon therein, zinc and carbon electrolytes, the latter resting on the former, and an insulating cylinder between the two electrolytes having holes or communications between the interior and exterior near its bottom below the bottom of the carbon electrolyte.

2. A galvanic element comprising a zinc container, a carbon, zinc and carbon electrolytes separated from each other by an insulating medium throughout a part of their extent, the electrolytes being in contact with each other throughout another part of their extent, and an insulation to partially protect the carbon from the zinc electrolyte.

3. A galvanic element comprising a zinc receptacle, a carbon, zinc and carbon electrolytes in the receptacle, a carbon electrolyte resting on the zinc electrolyte at its bottom, but insulated therefrom on its sides, the carbon extending into the zinc electrolyte at its bottom but insulated therefrom.

4. A galvanic element comprising a zinc receptacle, a carbon, the receptacle being sealed at its top, zinc and carbon electrolytes in a solid or semi-solid form, the carbon electrolyte resting on the zinc electrolyte at its bottom, insulating means for separating the carbon and zinc electrolytes at the side of the latter, the carbon extending through the carbon electrolyte and into the zinc electrolyte, but insulated from the latter as set forth.

5. A galvanic element comprising a zinc receptacle a carbon electrolyte consisting of bichromate of soda, sulphuric acid and water, a zinc electrolyte consisting of a solution of potash, one electrolyte resting upon the other but insulated therefrom throughout the larger part of their contiguous surfaces as described.

In testimony whereof I hereunto affix my signature.

ALBERT ADAMS.